US 12,504,270 B2

(12) United States Patent
Nishimura et al.

(10) Patent No.: US 12,504,270 B2
(45) Date of Patent: Dec. 23, 2025

(54) CALCULATION METHOD, IMAGE-CAPTURING METHOD, AND IMAGE-CAPTURING APPARATUS

(71) Applicant: Lasertec Corporation, Kanagawa (JP)

(72) Inventors: Yoshihiro Nishimura, Yokohama (JP); Hiroyuki Maekawa, Yokohama (JP); Shota Fujiki, Yokohama (JP)

(73) Assignee: LASERTEC CORPORATION, Yokohama (JP)

( * ) Notice: Subject to any disclaimer, the term of this patent is extended or adjusted under 35 U.S.C. 154(b) by 194 days.

(21) Appl. No.: 18/328,518

(22) Filed: Jun. 2, 2023

(65) Prior Publication Data

US 2023/0392919 A1    Dec. 7, 2023

(30) Foreign Application Priority Data

Jun. 3, 2022    (JP) ................................ 2022-090926

(51) Int. Cl.
    *G01B 9/04*          (2006.01)
    *G02B 21/00*        (2006.01)

(52) U.S. Cl.
    CPC ............ *G01B 9/04* (2013.01); *G02B 21/0056* (2013.01); *G02B 21/0072* (2013.01); *G01B 2210/56* (2013.01)

(58) Field of Classification Search
    CPC .. G01B 9/04; G01B 2210/56; G02B 21/0056; G02B 21/0072; G01M 11/00; G01M 11/0271
    See application file for complete search history.

(56) References Cited

U.S. PATENT DOCUMENTS

| | | | | |
|---|---|---|---|---|
| 5,430,548 A | * | 7/1995 | Hiroi | ................ G01N 21/95607 250/548 |
| 6,344,898 B1 | * | 2/2002 | Gemma | .................... G01J 9/02 356/521 |
| 10,809,055 B2 | * | 10/2020 | Huang | ................ G01B 11/2441 |

(Continued)

FOREIGN PATENT DOCUMENTS

| | | |
|---|---|---|
| JP | S6469933 A | 3/1989 |
| JP | H01219605 A | 9/1989 |
| JP | H0789043 B2 * | 9/1995 |

(Continued)

*Primary Examiner* — Kara E. Geisel
*Assistant Examiner* — Christina I Xing
(74) *Attorney, Agent, or Firm* — McCoy Russell LLP

(57) ABSTRACT

A calculation method according to the present disclosure is a calculation method of calculating a shear amount produced by a predetermined optical element which is arranged on an optical path of an image-capturing optical system. The calculation method includes a step of capturing a plurality of interference contrast images of a quadric surface included in an object surface by the image-capturing optical system while changing a phase difference between two rays of divided light, a step of obtaining a phase distribution from the plurality of interference contrast images by a phase shift method, a step of measuring a fringe interval of interference fringes due to the quadric surface based on the phase distribution, and a step of calculating the shear amount of the optical element based on a constant in a formula expressing the quadric surface and the fringe interval.

13 Claims, 12 Drawing Sheets

(56) References Cited

U.S. PATENT DOCUMENTS

2006/0023225 A1* 2/2006 Tobben .............. G02B 21/0016
356/497

FOREIGN PATENT DOCUMENTS

| | | |
|---|---|---|
| JP | 2527176 B2 | 8/1996 |
| JP | H0961370 A | 3/1997 |
| JP | 2004037429 A | 2/2004 |

* cited by examiner

CALCULATION METHOD, IMAGE-CAPTURING METHOD, AND IMAGE-CAPTURING APPARATUS

CROSS REFERENCE TO RELATED APPLICATIONS

The present application claims priority to Japanese Patent Application No. 2022-090926 filed on Jun. 3, 2022. The entire contents of the above-listed application are hereby incorporated by reference for all purposes.

BACKGROUND

The present disclosure relates to a calculation method, an image-capturing method, and an image-capturing apparatus and particularly to a technique for calculating a shear amount.

A technique for quickly performing defect inspection and categorization of a compound semiconductor wafer, a glass substrate, and so forth is very necessary for quality control or improvement in a device or a product. Patent Literature 1 discloses a defect inspection apparatus using a differential interference contrast microscope. A differential interference contrast microscope separates illumination light into ordinary light and extraordinary light by a differential interference contrast prism (for example, a Nomarski prism). A shift amount between positions of the ordinary light and the extraordinary light is referred to as shear amount.

A path difference between the ordinary light and the extraordinary light will be described with reference to FIG. 1. The vertical direction (Z direction) in FIG. 1 represents a height direction. The lateral direction (S direction) in FIG. 1 represents a direction in which the illumination light is separated into the ordinary light and the extraordinary light, in other words, a shear direction. The ordinary light and the extraordinary light are linearly polarized light which vibrates in the S direction and linearly polarized light which vibrates in a direction perpendicular to the S direction.

FIG. 1 includes the ordinary light and the extraordinary light in a case where the shear amount is $\Delta S_1$ and the ordinary light and the extraordinary light in a case where the shear amount is $\Delta S_2$. A shear amount of $\Delta S_2$ is larger than $\Delta S_1$. An upper surface of a sample 50 is inclined at an angle of 1 with respect to the horizontal direction. A term $d_1$ denotes a difference in height in a case where the ordinary light and the extraordinary light are reflected by the sample 50 when the shear amount is $\Delta S_1$. A term $d_2$ denotes a difference in height in a case where the ordinary light and the extraordinary light are reflected by the sample when the shear amount is $\Delta S_2$. The term $d_2$ is larger than $d_1$.

Patent Literature 1: Japanese Unexamined Patent Application Publication No. H9-061370
Patent Literature 2: Japanese Unexamined Patent Application Publication No. 2004-037429
Patent Literature 3: Japanese Unexamined Patent Application Publication No. H1-219605
Patent Literature 4: Japanese Unexamined Patent Application Publication No. H1-069933
Patent Literature 5: Japanese Patent No. 2527176

SUMMARY

When inspection or categorization is performed by using a differential interference contrast image, in order to maintain precision, it is preferable that an intensity of a received light signal of a flat surface portion having no defect be made constant. Accordingly, inspections can be performed by using the same threshold value. In order to make constant the intensity of the received light signal, a path difference between ordinary light and extraordinary light has to be made constant, the path difference being produced by a Nomarski prism.

The path difference between the ordinary light and the extraordinary light is defined by a shear amount of a differential interference contrast prism and position adjustment of the differential interference contrast prism. Consequently, in a case where the shear amount of the differential interference contrast prism can be calculated, the position adjustment of the differential interference contrast prism is performed in accordance with a calculation result, and the intensity of the received light signal can thereby be maintained constant. In a case where the shear amount of the differential interference contrast prism can be calculated, by using the differential interference contrast prism having an appropriate shear amount, the intensity of the received light signal can be maintained constant. The intensity of the received light signal is made constant, and inspection conditions in cases where various samples are inspected by using the same apparatus can be made constant. Machine differences among different apparatuses with the same design can be reduced.

A description will be made about problems in a case where various samples are inspected by using the same apparatus. The path difference itself of the differential interference contrast prism (for example, the Nomarski prism) can be adjusted by using a level difference which is horizontally situated. Note that the path difference of the differential interference contrast prism denotes a path difference between the ordinary light and the extraordinary light, which occurs regardless of the samples. However, an actual sample (for example, a wafer) includes an inclination. In particular, a defect portion of the sample includes an inclination even when the sample itself is horizontal. Consequently, even in a case where the path difference of the differential interference contrast prism is the same and the same defect portion is observed, when the shear amount $\Delta S$ is different, the path difference between the ordinary light and the extraordinary light does not become the same, and the same brightness is not obtained. Because a portion having no defect includes an inclination, even when adjustment is performed such that the path difference of the differential interference contrast prism becomes the same, the same brightness is not obtained when the shear amount $\Delta S$ is different. In this case, it is difficult to conduct a defect inspection with a predetermined threshold value of brightness.

A description will be made about an example of a method for reducing the machine differences between different apparatuses with the same design. It is assumed that adjustment of the differential interference contrast prism is performed, in other words, the path difference of the differential interference contrast prism is defined in an apparatus A and an inspection is performed in an apparatus B under the same condition. In a case where the shear amount of the differential interference contrast prism can be measured, it can be determined that the shear amount of the differential interference contrast prism included in the apparatus A and the shear amount of the differential interference contrast prism included in the apparatus B are different from each other. In a case where the shear amounts are different, the differential interference contrast prism included in the apparatus B can be replaced by a differential interference contrast prism whose shear amount is included in a permissible range, or fine adjustment can be performed for the position of the differential interference contrast prism such that a change in brightness of a defect portion or the like is compensated, the change occurring due to a difference in the shear amount.

The above and other objects, features and advantages of the present disclosure will become more fully understood from the detailed description given hereinbelow and the accompanying drawings which are given by way of illustration only, and thus are not to be considered as limiting the present disclosure.

Accordingly, it is desired that a shear amount of a differential interference contrast prism be calculated. However, it is difficult to calculate the shear amount of the differential interference contrast prism based on a sample having a level difference or an inclination angle on a flat surface. There may be cases where even when images of a sample with a level difference are captured by using differential interference contrast prisms having different shear amounts, a sufficient difference cannot be observed between differential interference contrast images. In general, because the shear amount of the Nomarski prism is approximately one or two pixels of a microscopic observation image, it is difficult to perform measurement based on a width measurement or the like of an interference intensity profile. There is also a problem that it is troublesome to change an inclination angle of a flat surface and a change in a reflected light intensity due to the inclination angle has to be taken into consideration.

The present disclosure has been made to solve such problems and provides a calculation method, an image-capturing method, and an image-capturing apparatus that can easily calculate a shear amount produced by a predetermined optical element which is arranged on an optical path of an interference optical system.

A calculation method according to the present disclosure is a calculation method of calculating a shear amount produced by a predetermined optical element which is arranged on an optical path of an interference optical system, the calculation method including:

a step of capturing a plurality of interference contrast images of a quadric surface included in an object surface by the interference optical system while changing a phase difference between two rays of light divided by the interference optical system;

a step of obtaining a phase distribution from the plurality of interference contrast images by a phase shift method;

a step of measuring a fringe interval of interference fringes due to the quadric surface based on the phase distribution; and a step of calculating the shear amount based on a constant in a formula expressing the quadric surface and the fringe interval.

An image-capturing method according to the present disclosure includes:

the calculation method;

a step of adjusting a position of the predetermined optical element based on the shear amount such that a path difference between two rays of light divided by the interference optical system becomes a predetermined value; and a step of capturing an interference contrast image of a sample by the interference optical system after the step of adjusting.

An image-capturing apparatus according to the present disclosure includes:

an interference optical system;

a predetermined optical element being arranged on an optical path of the interference optical system; and a processing unit configured to generate a phase distribution, by a phase shift method, from a plurality of interference contrast images of a quadric surface included in an object surface, the plurality of interference contrast images being captured while a phase difference between two rays of light divided by the interference optical system is changed, and to subsequently execute a process of calculating a shear amount of the optical element based on a fringe interval of interference fringes due to the quadric surface, the fringe interval being measured from the phase distribution, and a constant in a formula expressing the quadric surface.

The present disclosure can provide a calculation method, an image-capturing method, and an image-capturing apparatus that can easily calculate a shear amount produced by a predetermined optical element which is arranged on an optical path of an interference optical system.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
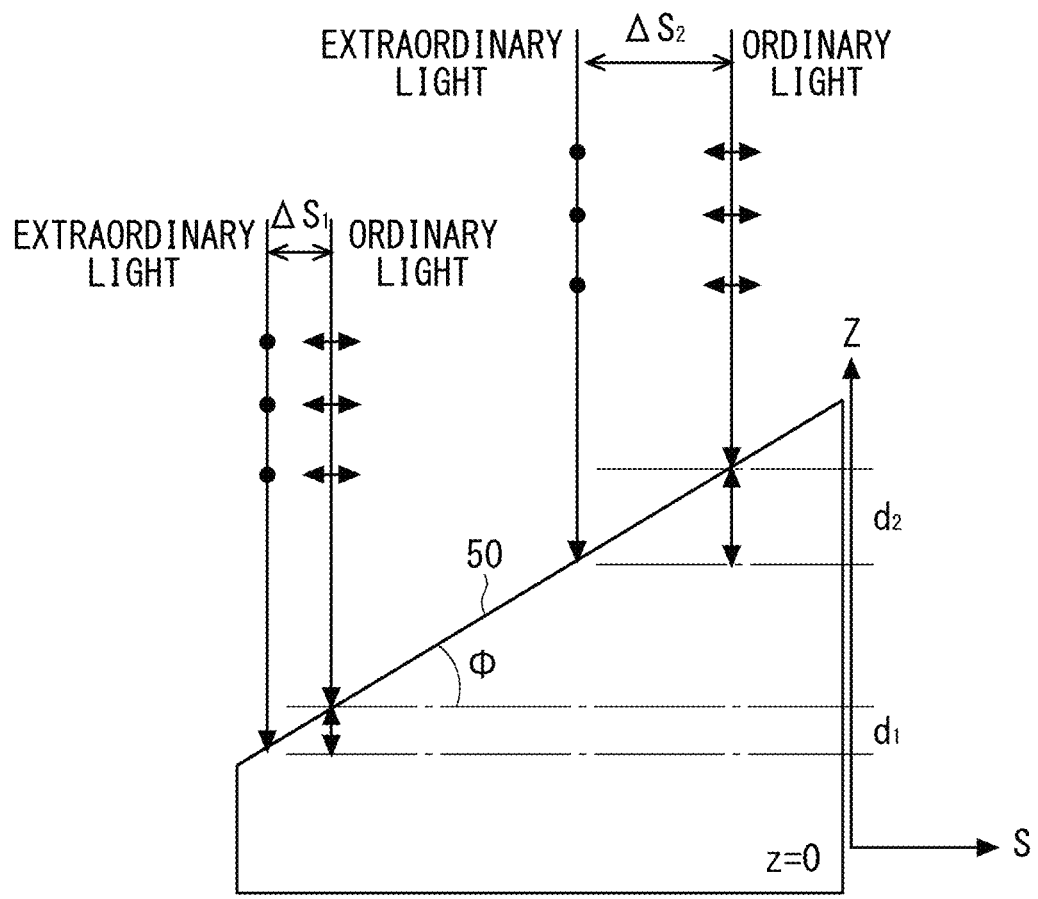
FIG. 1 is a diagram for explaining a relationship between a shear amount and a path difference.

A specific configuration of the present embodiment will hereinafter be described with reference to drawings. The following descriptions describe a preferable embodiment of the present disclosure, but the scope of the present disclosure is not limited to the following embodiment. In the following descriptions, elements provided with the same reference characters represent substantially the same contents.

First Embodiment

In the following, a calculation method, an image-capturing method, and an image-capturing apparatus according to a first embodiment will be described with reference to the drawings. The calculation method according to the first embodiment (hereinafter, referred to as present calculation method) calculates a shear amount produced by a predetermined optical element (for example, a differential interference contrast prism) which is arranged on an optical path of an image-capturing optical system (for example, a confocal optical system). The image-capturing optical system is an interference optical system. In the following, a description will mainly be made about a case where the image-capturing optical system is a confocal optical system. Further, in the following, a description will mainly be made about a case where the image-capturing optical system is a differential interference contrast optical system, but the image-capturing optical system may be another interference optical system (for example, a shearing interference optical system).

Figure 2:
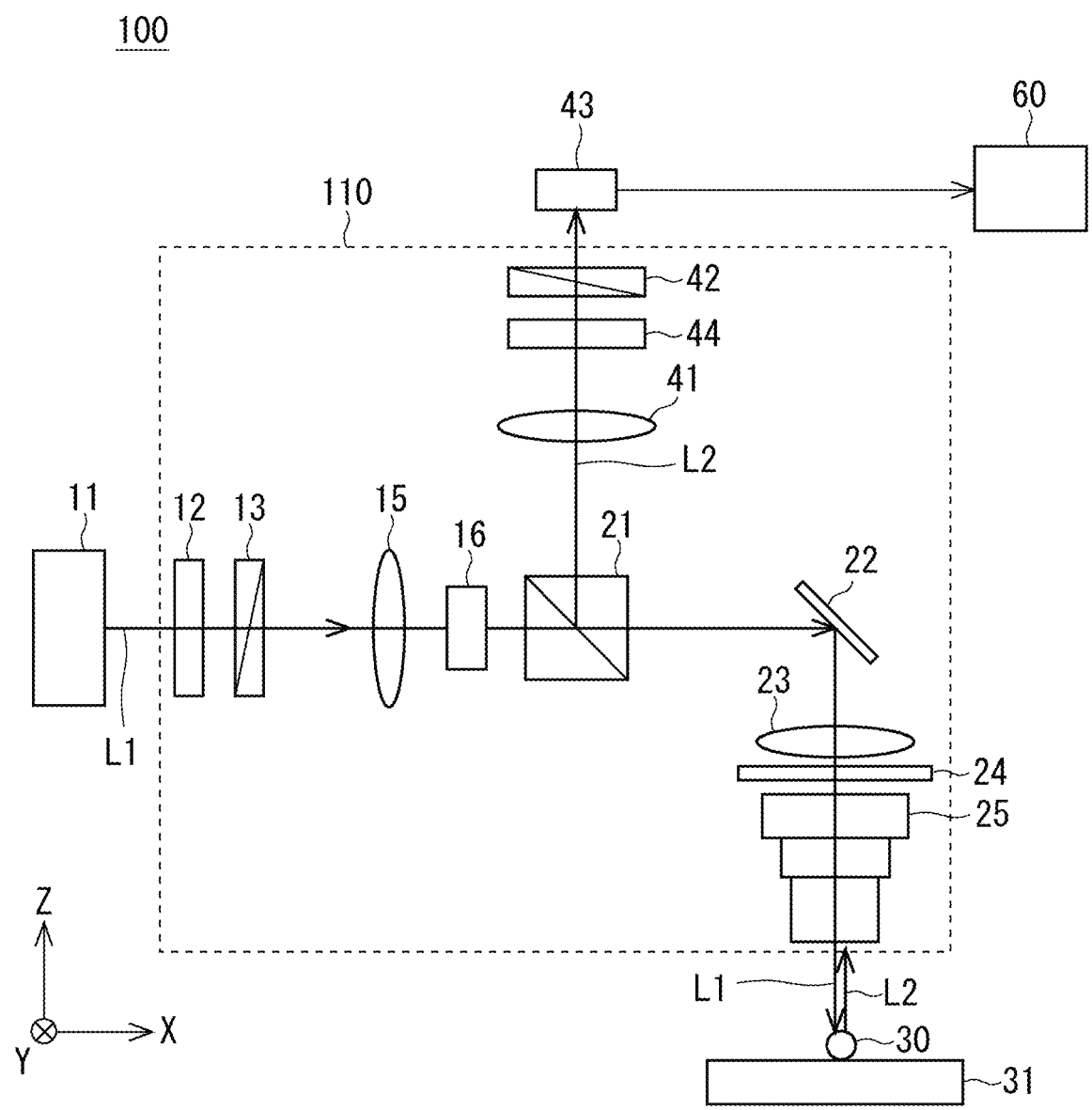
FIG. 2 illustrates a configuration of an image-capturing apparatus which is used in a calculation method according to a first embodiment.

First, an image-capturing apparatus 100 used in the present calculation method will be described with reference to FIG. 2. The image-capturing apparatus 100 detects reflected light, which is reflected by a sample (not illustrated), via the confocal optical system. The image-capturing apparatus 100 captures an image of a sample surface based on a detection result of the reflected light. The sample may be a wafer or the like of a compound semiconductor such as SiC or GaN or of a piezoelectric crystal. The sample may be a transparent wafer or a transparent substrate.

On the optical path of the confocal optical system, a predetermined optical element such as a differential interference contrast prism (for example, a Nomarski prism) is arranged. The predetermined optical element provides a relative lateral shift displacement to two rays of light divided by the interference optical system. In the following, a description will mainly be made about a case where the predetermined optical element is the differential interference contrast prism, but the predetermined optical element is not limited to a prism but may be a lens or a diffraction grating. In order to evaluate the differential interference contrast prism, the image-capturing apparatus 100 captures a differential interference contrast image of a quadric surface (for example, a sphere surface) included in an object surface. In a case where the quadric surface is a sphere surface, the sphere surface may be a surface of a steel ball for ball bearing or may be a surface of a glass bead, for example. In the following, a description will mainly be made about a case where the quadric surface is a sphere surface, but the quadric surface may be a paraboloid or a circular column.

The image-capturing apparatus 100 includes a light source 11, an image-capturing optical system 110, a stage 31, a photodetector 43, and a processing unit 60. The image-capturing apparatus 100 is a confocal microscope which has the image-capturing optical system 110 as the confocal optical system. The image-capturing optical system 110 will also be referred to as interference optical system.

The light source 11 produces illumination light L1 for illuminating a spherical body 30. The light source 11 is a laser light source, a lamp light source, or the like, for example. The image-capturing optical system 110 guides the illumination light L1 to the spherical body 30. The image-capturing optical system 110 is a line confocal optical system, for example, and forms a linear illumination region on the spherical body 30.

The image-capturing optical system 110 includes a filter 12, a polarizer 13, a lens 15, a slit 16, a half mirror 21, a scanner 22, a lens 23, a Nomarski prism 24, an objective lens 25, a lens 41, a ¼ wavelength plate 44, and an analyzer 42.

The illumination light L1 from the light source 11 is incident on the filter 12. The filter 12 is a bandpass filter, for example, and transmits light only at a predetermined wavelength. The illumination light L1 from the filter 12 is made linearly polarized light by the polarizer 13. The illumination light L1 is collected by the lens 15 and is incident on the slit 16. The slit 16 is arranged in a position conjugate with a focal plane of the objective lens 25. The slit 16 forms the illumination light into a linear shape.

The illumination light L1 as the linearly polarized light is incident on the scanner 22 via the half mirror 21. The half mirror 21 is a beam splitter which branches optical paths of the illumination light L1 and a reflected light L2 from the spherical body 30. The half mirror 21 transmits half incident light and reflects the remaining half.

The scanner 22 is provided as a vibrating mirror, a galvanometer mirror, a rotation mirror, or the like and deflects the illumination light L1. For example, on the spherical body 30, scanning with the illumination light L1 is performed in a direction orthogonal to the longitudinal direction of the linear illumination region.

The illumination light L1 reflected by the scanner 22 is incident on the Nomarski prism 24 via the lens 23. The Nomarski prism 24 is a differential interference contrast prism and branches the illumination light L1 as the linearly polarized light into two light beams. In other words, the illumination light L1 is transmitted through the Nomarski prism 24 and thereby becomes two intersecting light beams which are shifted in a lateral direction by a predetermined shear amount. Note that the differential interference contrast prism is not limited to the Nomarski prism 24, but a Wollaston prism may be used.

The two light beams branched by the Nomarski prism 24 are orthogonal beams of linearly polarized light. In other words, one of the two light beams becomes ordinary light, and the other becomes extraordinary light. The two light beams branched by the Nomarski prism 24 are collected by the objective lens 25 and illuminate the spherical body 30. The two light beams illuminate different points on the spherical body 30. The ordinary light and the extraordinary light become beams of parallel light which are laterally shifted from each other when those pass through the objective lens 25. A lateral shift amount will be referred to as shear amount. A direction of a lateral shift (shear direction) may be a direction of −45 [deg] with respect to an X axis in an XY plane, for example.

A focusing position by the objective lens 25 is on the surface of the spherical body 30. Because the slit 16 and a focal point of the objective lens 25 are in a conjugate image-forming relationship, on the spherical body 30, the linear illumination region corresponding to a slit direction is formed. For example, on the spherical body 30, the longitudinal direction of the linear illumination region is an X direction, and a scanning direction of the scanner 22 is a Y direction.

The spherical body 30 and the sample are placed on the stage 31. The stage 31 is a driven stage and moves the spherical body 30 in XYZ directions. A Z-scan is performed by the stage 31. The stage 31 moves in the Z direction, and a light collecting position of the illumination light L1 can thereby be set to the surface of the spherical body 30. It goes without saying that the objective lens may be moved along an optical axis instead of the stage 31 to thereby align the light collecting position with the surface of the spherical body 30. By performing the Z-scan, a focused image and a height image of the spherical body can be obtained. In a case where surface unevenness is small, an image of the spherical body 30 may be captured in a state where the surface is focused without performing the Z-scan.

The reflected light L2 reflected by the spherical body 30 includes two light beams. The reflected light L2 reflected by the spherical body 30 is incident on the Nomarski prism 24 via the objective lens 25. The Nomarski prism 24 combines the two light beams. The reflected light L2 is refracted by the lens 23 and is incident on the scanner 22. The reflected light L2 is descanned by the scanner 22 and is incident on the half mirror 21. The half mirror 21 reflects half the reflected light L2 in a direction of the lens 41.

The lens 41 collects the reflected light L2 from the half mirror 21 to a light receiving surface of the photodetector 43. The photodetector 43 is a line sensor in which plural pixels are arrayed in one line, for example. The pixels of the photodetector 43 are arrayed along a direction corresponding to the linear illumination region. The light receiving surface of the photodetector 43 and the focal plane of the objective lens 25 are arranged in conjugate positions. The photodetector 43 detects reflected light from the spherical body 30 via the image-capturing optical system 110.

It goes without saying that the photodetector 43 is not limited to a line sensor but may be a zero-dimensional sensor. In a case where the zero-dimensional sensor is used, the confocal optical system can be configured by combining the zero-dimensional sensor with a pinhole or a point light source. In such a case, the slit 16 does not have to be used.

The stage 31 changes a height of the spherical body 30 such that the surface of the spherical body 30 is set to the light collecting position of the illumination light L1.

In the image-capturing optical system 110, in a case where the surface of the spherical body 30 is set to the light collecting position of the illumination light L1, a detected light amount by the photodetector 43 becomes highest. In other words, reflected light from a plane deviated from the focal plane of the objective lens 25 is not detected by the photodetector 43.

As described above, the scanner 22 performs a scan on the spherical body 30 by the illumination light L1. Thus, the image-capturing apparatus 100 can acquire a confocal image of the surface of the spherical body 30 or the sample. The photodetector 43 captures a confocal image in which the surface of the spherical body 30 is set to the focusing position. The confocal image becomes a two-dimensional image in the XY directions. Note that when an image of reflected light is captured by the image-capturing optical system 110, there are a case where the Z-scan is not performed and an image is normally captured and a case where an image in which a whole field of view is focused (all-in-focus image) is captured by performing the Z-scan (focus scan). The latter all-in-focus image is used for a surface having large unevenness. Because measurement of a reflected image and of unevenness of the surface can simultaneously be performed by performing the Z-scan, the height image can be acquired.

The ¼ wavelength plate 44 and the analyzer 42 are arranged between the lens 41 and the photodetector 43. The reflected light L2 passes through the ¼ wavelength plate 44, and a polarization state is thereby changed. The reflected light L2 which is transmitted through the ¼ wavelength plate 44 is incident on the photodetector 43 via the analyzer 42. In other words, the photodetector 43 detects the reflected light L2 which is transmitted through the ¼ wavelength plate 44 and the analyzer 42. An optic axis of the ¼ wavelength plate 44 is set to zero degree with respect to a direction of the linearly polarized light emitted from the polarizer 13. Accordingly, the ordinary light and the extraordinary light which pass through the Nomarski prism 24 are converted to rays of circularly polarized light which are in rotational directions opposite from each other.

The analyzer 42 is rotatably arranged on the optical path of the reflected light L2. A rotation axis of the analyzer 42 is parallel with the optical axis. The analyzer 42 is a polarizing element which transmits only a predetermined linearly polarized light component. In other words, the linearly polarized light which is parallel with a transmission axis of the analyzer 42 is detected by the photodetector 43. By rotating the analyzer 42, a direction of the linearly polarized light to be detected by the photodetector 43 can be changed.

In order to perform measurement by a phase shift method, a rotation angle $\theta$ of the analyzer 42 is changed. The rotation angle 0 is changed in increments of 45°, and detection of reflected light is performed. For example, while an initial rotation angle $\theta$ is set as a reference angle of 0°, the reflected light L2 is detected at four rotation angles of 0°, 45°, 90°, and 135°. In other words, the rotation angle of the analyzer 42 is changed, and four confocal images are thereby captured. When the rotation angle of the analyzer is $\theta$, a phase difference between the ordinary light and the extraordinary light becomes $2\theta$.

The processing unit 60 acquires the confocal image captured by the photodetector 43. The processing unit 60 is an information processing apparatus such as a personal computer. The processing unit 60 has a memory or the like which stores confocal images. The processing unit 60 stores the detected light amount by the photodetector 43 in association with XYZ coordinates. The processing unit 60 constructs the all-in-focus image while associating the XYZ coordinates with the detected light amount, for example. Specifically, the all-in-focus image becomes an image having a two-dimensional reflection intensity (bright-field). The processing unit 60 acquires the height image of the spherical body 30. The height image is reconfigured in the processing unit 60 such that the height image becomes a three-dimensional (the height is expressed by grayscale).

The processing unit 60 includes a processor and so forth for performing calculation (phase shift calculation) by the phase shift method. The processing unit 60 may control a motor for rotating the analyzer 42. The processing unit 60 may also control drive of the stage 31.

Next, the present calculation method and the image-capturing method (referred to as present image-capturing method) according to the first embodiment will be described with reference to FIG. 3. The present calculation method includes step S101 to step S109. The present image-capturing method includes step S101 to step S111.

First, the image-capturing optical system 110 as the confocal optical system is used to measure a three-dimensional shape of the surface of the spherical body 30 (step S101). In this case, the polarizer 13, the Nomarski prism 24, and the analyzer 42 may be detached from the optical path of the image-capturing optical system 110. Note that only the polarizer 13 and the analyzer 42 may be detached. The objective lens 25 used in step S101 may be different from the objective lens 25 which is used in differential interference contrast observation.

Figure 4:
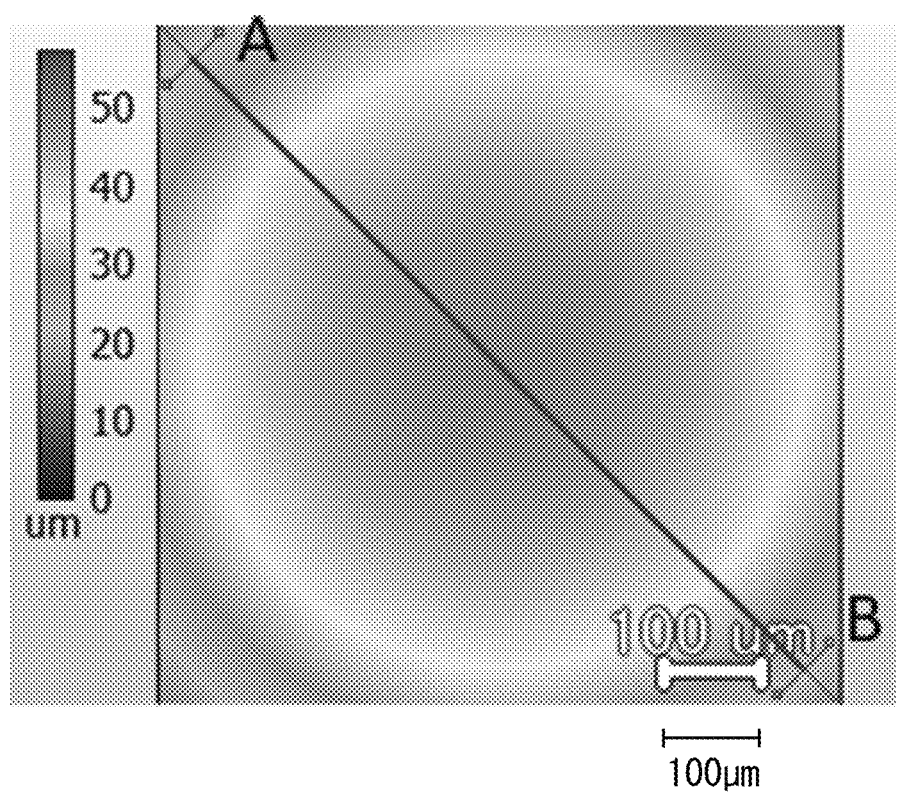
FIG. 4 illustrates measurement results of a three-dimensional shape of a spherical body surface.

FIG. 4 illustrates one example of the three-dimensional shape of the spherical body 30 which is measured by the image-capturing apparatus 100. The height of the surface of the spherical body 30 is represented by grayscale. A line A-B represents a line along the shear direction.

Returning to FIG. 3, the description will be continued. Next, based on the three-dimensional shape of the surface of the spherical body 30, a radius R of the spherical body 30 is estimated (step S102).

Figure 5:
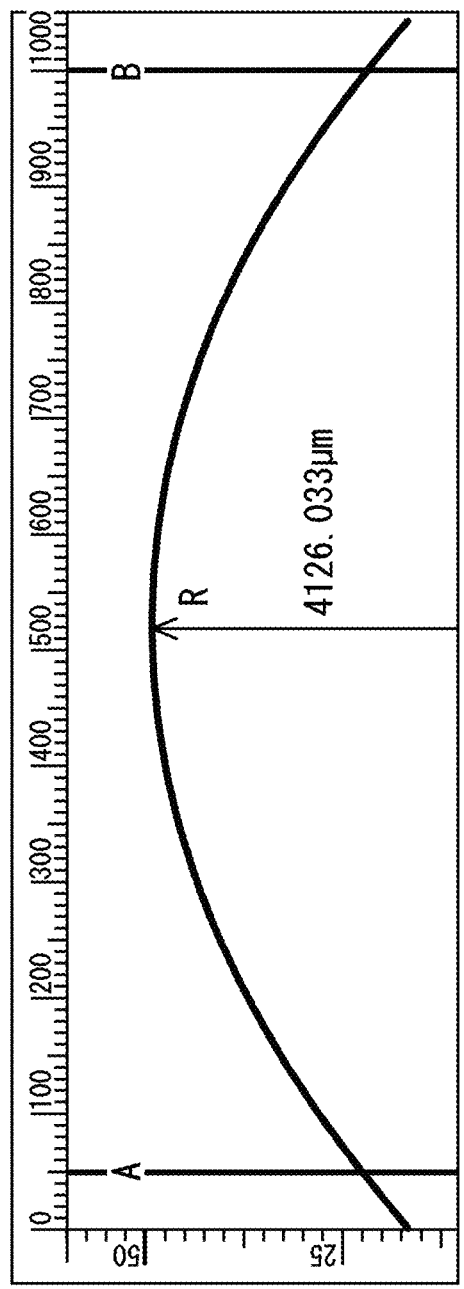
FIG. 5 is a diagram for explaining a method for estimating a radius of a spherical body.

A calculation method of the radius R will specifically be described with reference to FIG. 5. FIG. 5 illustrates a profile of the height along the line A-B in FIG. 4. The radius R (for example, 4126.033 µm) is calculated by performing least square fitting by a circle for the profile of the height.

Returning to FIG. 3, the description will be continued. Next, switching to the differential interference contrast observation is performed (step S103). The Nomarski prism 24 is arranged, and the objective lens 25 is selected whose shear amount is desired to be calculated. As one example, a description will be made about a case where the objective lens 25 is selected whose numerical aperture (NA) is 0.15 and whose magnification is 5 times. A limit angle θ, at which the reflected light can be received, as seen from the optical axis is defined from the NA. The angle θ is 8.6 degrees, and a radius r of a partial circle which is seen in the field of view is 600 µm. The field of view (3 mm) of the objective lens in a case of NA=0.15 includes a whole region in which reflection observation can be performed. In a case of R=4,000 µm, even if the shear amount is 1 to µm, the path difference in the partial circle is sufficiently larger than an illumination wavelength λ (for example, 546 nm). As described above, the radius R, the NA, and the field of view have to be set such that the path difference in the partial circle becomes several times the illumination wavelength λ.

Figure 6:
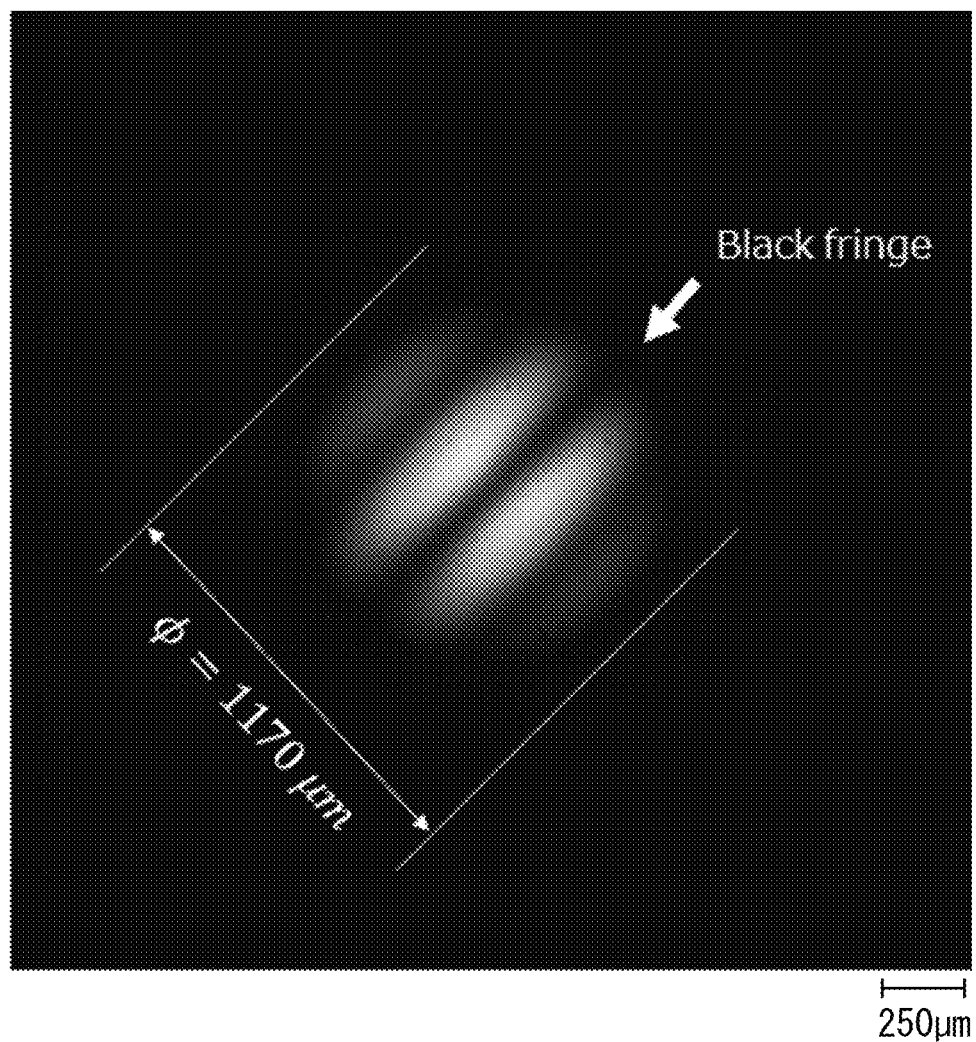
FIG. 6 is a differential interference contrast image of the spherical body surface in a case where white light is used.
Figure 7:
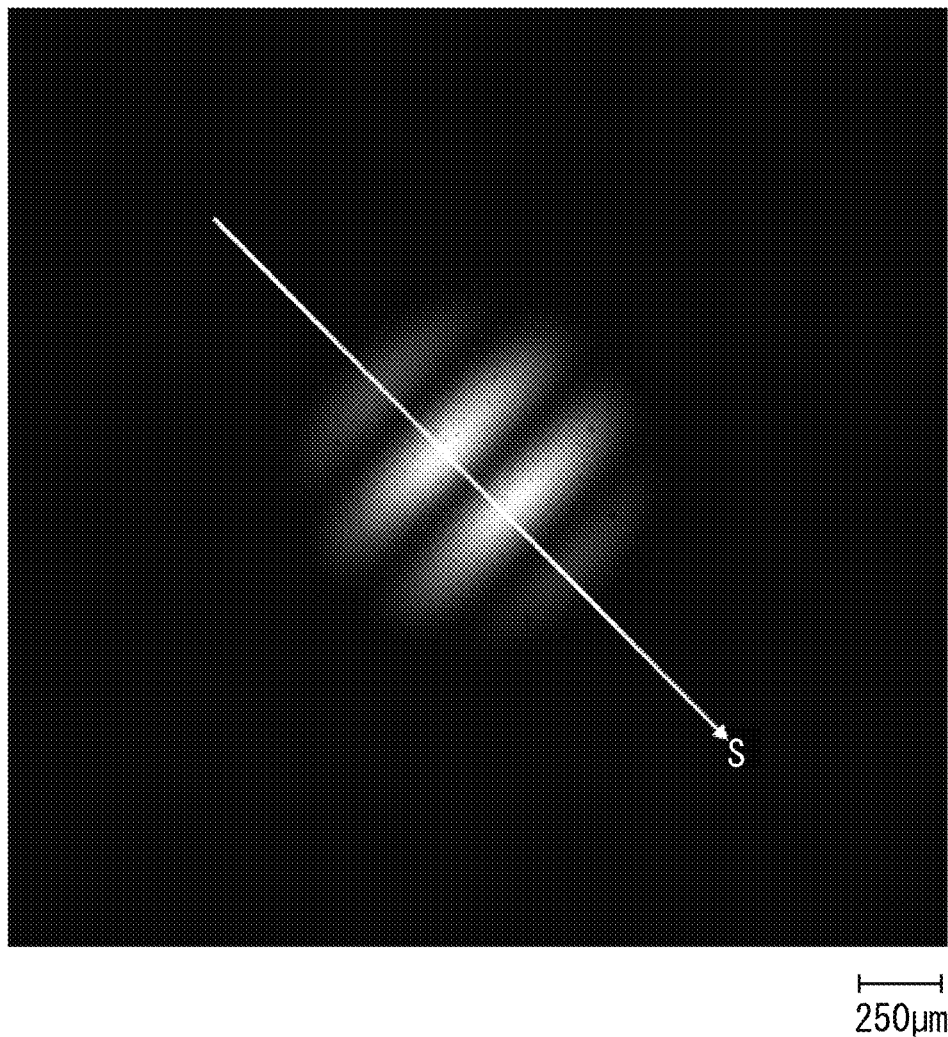
FIG. 7 is a differential interference contrast image of the spherical body surface in a case where monochromatic light is used.

FIG. 6 illustrates the differential interference contrast image in a case where white light is used, and FIG. 7 illustrates the differential interference contrast image in a case where monochromatic light (for example, a wavelength of 546 nm) is used. Note that color interference fringes can be obtained in a case where white light is used, but FIG. 6 illustrates a grayscale image converted from the color interference fringes. A black fringe in a central portion exhibits a zero-order interference fringe. A diameter φ of a partial circle seen in the field of view is 1,170 µm. An s-direction illustrated in FIG. 7 (the direction in which interference fringes are aligned) indicates the shear direction of the Nomarski prism 24.

Returning to FIG. 3, the description will be continued. Next, the processing unit 60 rotates the analyzer 42 (step S104). The rotation angles of 0°, 90°, and 135° of the analyzer 42 are set, and those are respectively set as j=1, 2, 3, 4.

Figure 8:
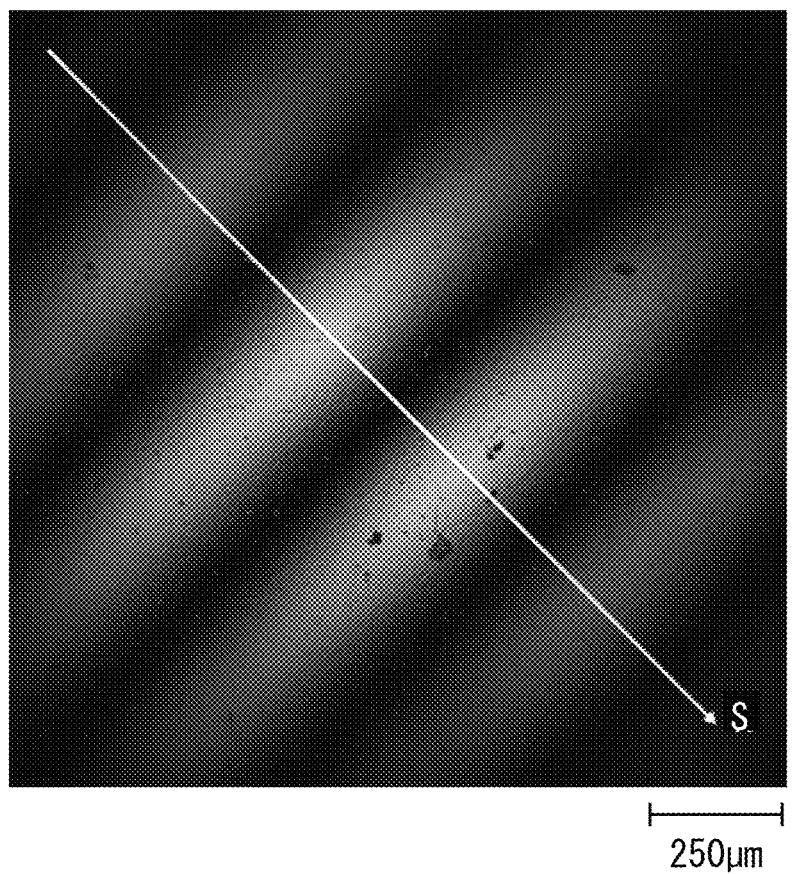
FIG. 8 illustrates an all-in-focus image of the differential interference contrast image in a case where monochromatic light is used.

The processing unit 60 drives the stage 31 upward and downward, and the Z-scan is thereby performed (step S105). Accordingly, the processing unit acquires a differential interference contrast image $D_j$. Here, because j=1 is given, a differential interference contrast image $D_1$ is acquired. FIG. 8 illustrates one example of the differential interference contrast image $D_j$. FIG. 8 includes interference fringes due to the surface of the spherical body 30. As described later, one or less interference fringe may be included in the differential interference contrast image $D_j$. Note that the differential interference contrast image $D_j$ may be acquired without performing the Z-scan.

Next, the processing unit 60 determines whether or not j=4 holds true (step S106). In a case where j=4 does not hold true (NO in step S106), processes in step S104 and step S105 are repeated until j=4 is given. Because j=1 is given in a case where the rotation angle of the analyzer 42 is 0°, the rotation angle of 45° is set, and j=2 is set. The processing unit 60 performs the Z-scan in step S105. Accordingly, a differential interference contrast image $D_2$ at the rotation angle of 45° can be acquired.

Similarly, the processing unit 60 sets the rotation angle to 90° and acquires a differential interference contrast image $D_3$ at j=3. The processing unit 60 sets j=4 and acquires a differential interference contrast image $D_4$ at j=4. It goes without saying that acquisition order of the differential interference contrast images $D_1$, $D_2$, $D_3$, and $D_4$ is not particularly limited. A plurality of differential interference contrast images $D_1$, $D_2$, $D_3$, and $D_4$ of the surface of the spherical body 30 are captured by the image-capturing optical system 110 and the Nomarski prism 24 while the phase difference between the ordinary light and the extraordinary light is changed. Note that a method for changing the phase difference between the ordinary light and the extraordinary light is not limited to a method in which the rotation angle of the analyzer 42 is changed. The phase difference may be changed by physically sliding a position of the Nomarski prism 24. The Nomarski prism 24 is slid in a direction crossing an optical axis of the image-capturing optical system 110, for example.

When j=4 is given (YES in step S106), the processing unit 60 obtains a phase distribution, by the phase shift method, from the plurality of differential interference contrast images $D_1$, $D_2$, $D_3$, and $D_4$ (step S107). The processing unit 60 calculates a phase a by using the following formula (1), for example. Calculation of the phase a may be performed for each pixel.

[Expression 1]

$$\alpha = \tan^{-1} \frac{D_3 - D_1}{D_4 - D_2} \quad (1)$$

Figure 9:
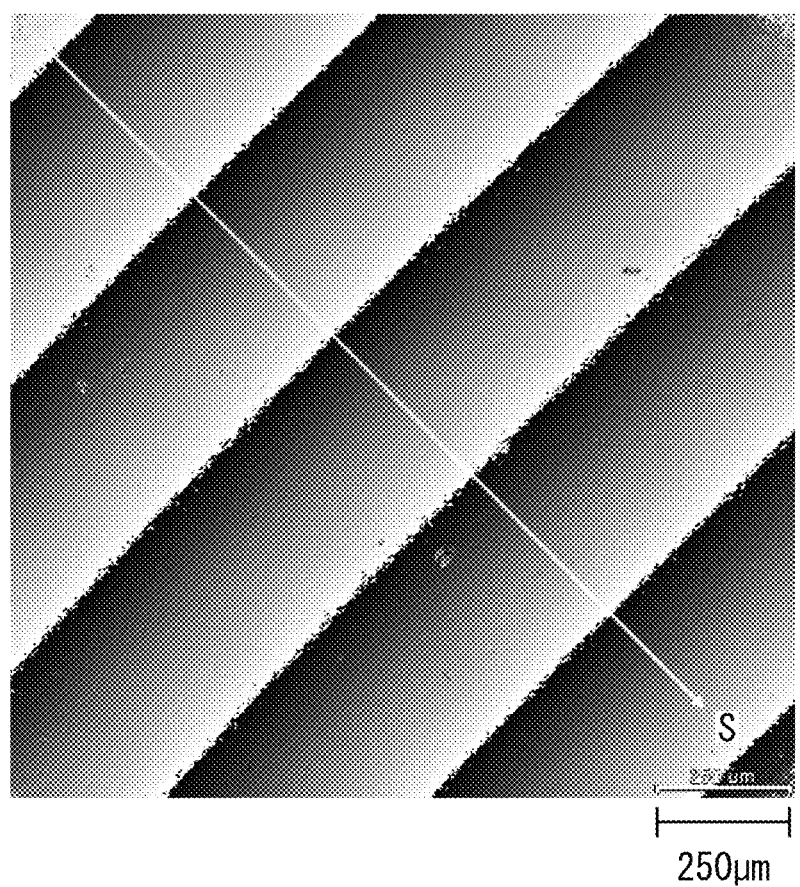
FIG. 9 illustrates a phase distribution of the spherical body surface.

FIG. 9 illustrates one example of the phase distribution obtained by the phase shift method. When FIG. 8 is compared with FIG. 9, brightness unevenness is reduced in FIG. 9. Accordingly, the present calculation method can more accurately calculate the shear amount of the Nomarski prism 24. In other words, the present calculation method can suppress an influence of an intensity change of the reflected light.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

Figure 10:
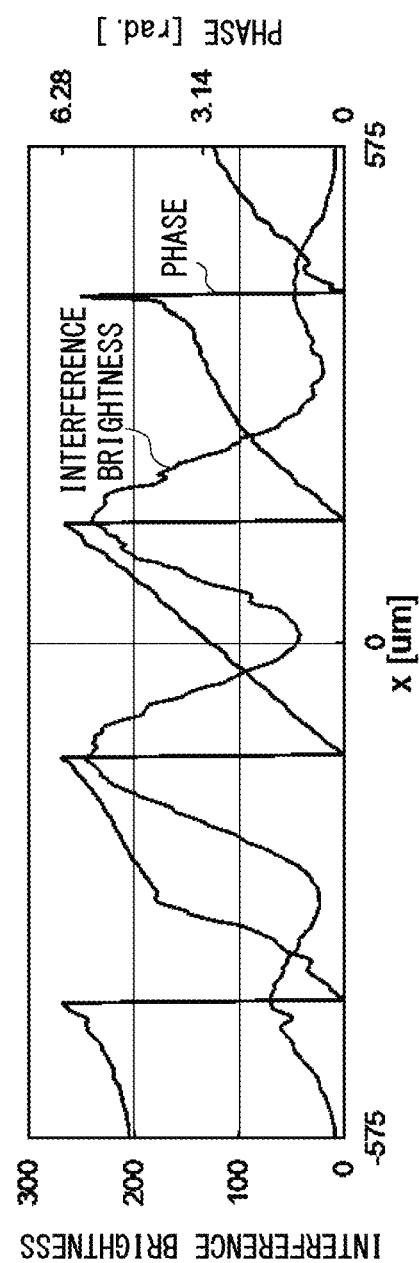
FIG. 10 illustrates a profile of the phase distribution along a shear direction.

Returning to FIG. 3, the description will be continued. Next, based on the phase distribution generated in step S107, a fringe interval of the interference fringes due to the surface of the spherical body 30 is measured (step S108). A method for obtaining the fringe interval of the interference fringes will be described with reference to FIG. 10. The horizontal axis in FIG. 10 represents the shear direction of the Nomarski prism 24. The vertical axis represents interference brightness or the phase α [rad] of the ordinary light and the extraordinary light. FIG. 10 includes a profile of an interference brightness distribution along the shear direction and a profile of the phase distribution along the shear direction. Because baseline correction is not performed for the profile of the interference brightness, a shift occurs between a cycle of the interference brightness distribution and a cycle of the phase distribution. There is a possibility that the cycle of the interference brightness distribution can be corrected by performing the baseline correction, but it might be difficult to perform optimal baseline correction depending on characteristics of the image-capturing optical system 110. In step S108, the fringe interval of the interference fringes is measured based on the cycle or a gradient of the phase distribution.

Figure 11:
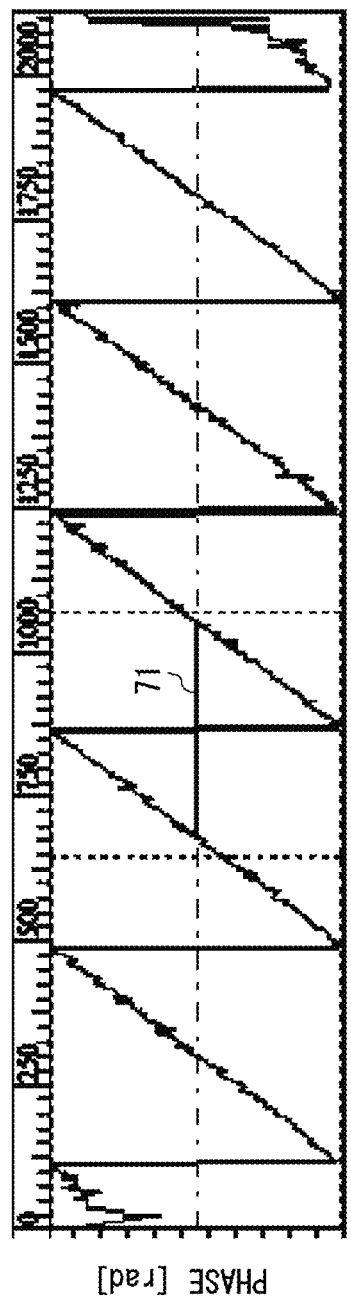
FIG. 11 is a diagram for explaining a method for measuring a fringe interval.

First, the cycle of the phase distribution along the shear direction will be described with reference to FIG. 11. FIG. 11 illustrates the profile of the phase distribution along the shear direction, and a line segment 71 extending in the horizontal direction corresponds to the cycle of the phase distribution. The profile of the phase distribution has a saw-like shape, and the interval of the interference fringes can more accurately be measured than a case where the interference brightness is used. Accordingly, the shear amount can more highly precisely be calculated.

Figure 12:
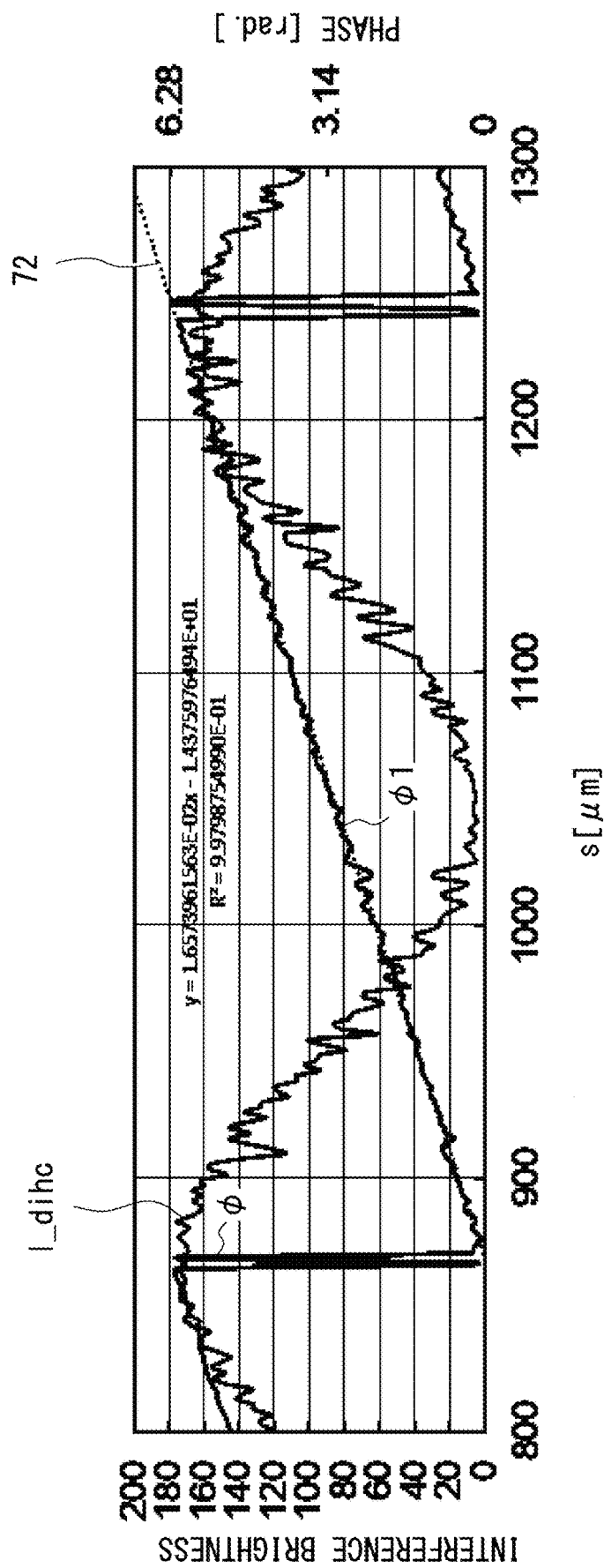
FIG. 12 is a diagram for explaining the method for measuring the fringe interval.

Next, a description will be made, with reference to FIG. 12, about a method for obtaining the fringe interval of the interference fringes based on the gradient of the phase distribution along the shear direction. The horizontal axis in FIG. 12 represents the shear direction of the Nomarski prism 24. The vertical axis represents the interference brightness or the phase. FIG. 12 includes a profile $\varphi$ of the phase distribution and a profile I_dihc of the interference brightness along the shear direction. The profile $\varphi$ of the phase distribution includes a part $\varphi_1$ which can be approximated to a straight line 72. The fringe interval of the interference fringes can be calculated by multiplying the reciprocal of the slope of the straight line 72 by $2\pi$. This method can be applied to a case where one or less interference fringe is included in the differential interference contrast image.

Returning to FIG. 3, the description will be continued. Next, based on the radius R estimated in step S102 and the fringe interval measured in step S108, the shear amount of the differential interference contrast prism is calculated by using a formula (2): $\Delta s=(\lambda \cdot R)/(2w)$ (step S109). Here, $\Delta s$ denotes the shear amount of the Nomarski prism 24. A term $\lambda$ denotes the wavelength of the monochromatic light used for capturing the differential interference contrast image. A term R denotes the radius of the spherical body. A term w denotes the fringe interval measured in step S108.

Next, a description will be made about a reason why the formula (2) holds true. First, in a case where s is set as the shear direction, a profile z(s) of a height z of the surface of the spherical body can sufficiently precisely be approximated to a quadratic function in a range of $-r \leq s \leq r$. In a case where z(s) is approximated to a quadratic function, z(s) is expressed as $dz/ds=-s/R$. A change in a slope of the surface of the spherical body 30 in the shear direction of the Nomarski prism 24 is approximated by a linear function.

Consequently, a path difference L(s) between the ordinary light and the extraordinary light separated by the Nomarski prism 24 is expressed as $L(s)=2*(dz/ds)*\Delta s=2*(-s/R)*\Delta s$. When the path difference L(s) is converted to a phase difference $\delta(s)$, $\delta(s)=(2\pi/\lambda)*2*(-s/R)*\Delta s$ holds true. Because the phase difference becomes $2\pi$ in a case of s=w, the formula (2): $\Delta s=(\lambda \cdot R)/(2w)$ holds true.

Returning to FIG. 3, the description will be continued. Next, based on the shear amount calculated in step S109, the position of the Nomarski prism 24 is adjusted (step S110). Specifically, the Nomarski prism 24 is moved in a direction crossing the optical axis of the image-capturing optical system 110, and the path difference between the ordinary light and the extraordinary light is adjusted. For example, in a case where the relationship between a movement amount of the Nomarski prism 24 and a change amount of the path difference is known, the path difference between the ordinary light and the extraordinary light is calculated based on the shear amount, and the movement amount of the Nomarski prism 24 may thereafter be decided such that the path difference becomes a predetermined value. Here, in addition to position adjustment of the Nomarski prism 24, adjustment of brightness and contrast may be performed. In a case where the shear amount is not included in a reference range, the Nomarski prism 24 may be replaced.

Next, the sample is placed on the stage 31, and the differential interference contrast image of the sample is captured by the image-capturing optical system 110 and the Nomarski prism 24 (step S111). Before the sample is placed on the stage 31, the spherical body 30 may be removed from the stage 31. Because the path difference between the ordinary light and the extraordinary light is adjusted in step S110, an inspection can be performed under the same inspection condition.

The above-described sample may be a transparent substrate or a transparent wafer. As for the transparent substrate and the transparent wafer, removing back-surface reflected light is important for enhancing detection precision of defect. Consequently, the detection precision of defect can be improved by capturing the differential interference contrast image by using the confocal optical system.

Note that order may arbitrarily be set between estimation of the radius of the spherical body in steps S101 to S102 and measurement of the fringe interval of the interference fringes in steps S103 to S108. In a case where the radius R of the spherical body 30 is known, step S101 and step S102 may not be performed. The case where the radius R is known is, for example, a case where the spherical body 30 is precisely manufactured or a case where the radius R is in advance measured by means other than the confocal optical system. In such a case, the image-capturing optical system 110 do not have to be the confocal optical system.

Next, the image-capturing apparatus according to the first embodiment will be described with reference to FIG. 2 and FIG. 3. The processing unit 60 of the image-capturing apparatus according to the first embodiment includes a function for executing step S109 illustrated in FIG. 3. The processing unit 60 may further include a function for executing step S102 illustrated in FIG. 3.

In the calculation method, the image-capturing method, and the image-capturing apparatus according to the first embodiment, the shear amount of the differential interference contrast prism can easily be calculated from the fringe interval of the interference fringes included in the differential interference contrast image of the spherical body.

Both of measurement of a surface shape of the spherical body and image-capturing of the interference fringes based on the spherical body can be executed by the confocal optical system for capturing an image of the sample. Consequently, no other apparatus has to be prepared in addition to the confocal microscope. Meaningful calculation results can be acquired by performing measurement by using the confocal optical system to be used for an inspection.

In the above description, a case where the shear amount of the differential interference contrast optical system is calculated is given as an example, but the shear amount of the interference optical system (for example, a shearing interference optical system) other than the differential interference contrast optical system can also be calculated. It is assumed that a predetermined optical element which provides a relative lateral shift displacement to two rays of divided light is arranged on an optical path of the interference optical system. The predetermined optical element is not limited to a prism-shaped element but may be a wedge-shaped or flat-plate-shaped element.

In the above description, the sphere surface is given as the quadric surface whose interference contrast image is captured, but an interference contrast image such as a circular column or a paraboloid may be captured. In a case where a radial direction of the circular column matches the shear direction, by setting the radius of the circular column as R, the shear amount can be calculated similarly to the sphere surface. In the above description, because the formula (2) is derived by approximating the profile of the height of the sphere surface by a quadratic function, a similar formula to the formula (2) is also derived in a case where the profile of the height is expressed by a quadratic function. For example, in a case where an expression of $z(s)=as^2$ is given, $dz/ds=2as$ holds true, and a formula: $\Delta s=(\lambda/2a)/(2w)$, which corresponds to the formula (1), is derived. When that is generalized, the shear amount can be calculated based on a constant (for example, the quadratic Ccoefficient a or the radius R) in the formula expressing the quadric surface and the fringe interval. Note that a sphere surface is expressed as $x^2+y^2+z^2=R^2$ or the like, the radius R is a constant in the formula expressing a sphere surface.

Figure 3:
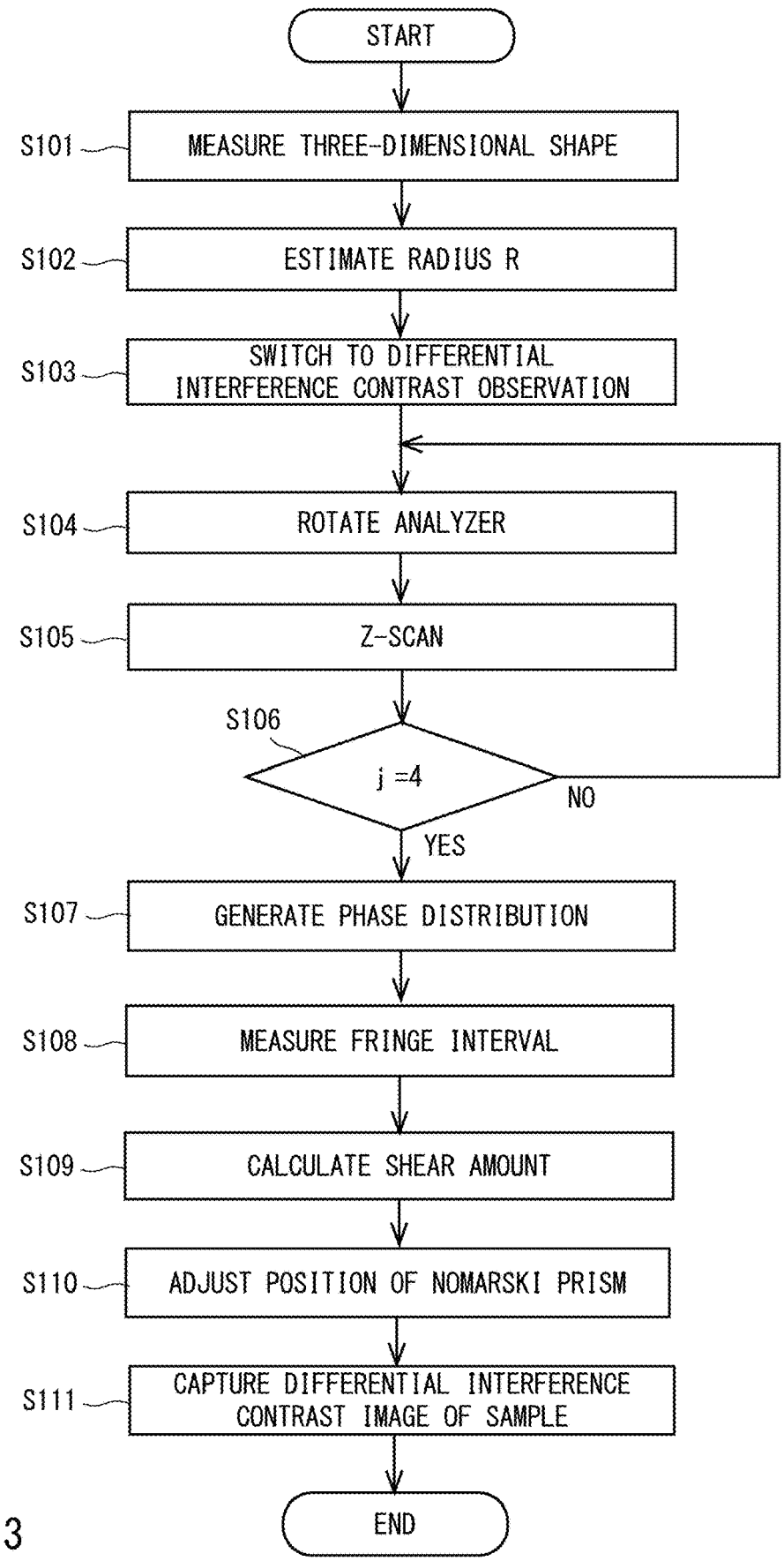
FIG. 3 is a flowchart illustrating a flow of the calculation method and an image-capturing method according to the first embodiment.

When the steps are generalized, in step S101 in FIG. 3, the three-dimensional shape of the quadric surface included in the object surface is measured by the interference optical system. In step S102, the constant in the formula expressing the quadric surface is estimated. In step S105, the interference contrast image of the quadric surface is captured. In step S109, the shear amount is calculated based on the constant in the formula expressing the quadric surface and the fringe interval. In step S110, the position of the optical element is adjusted such that the path difference between the two rays of light divided by the interference optical system becomes the predetermined value.

In a case where the quadric surface is a sphere surface, it is possible to determine not only the shear amount but also the shear direction. In a case where the shear direction is not known, evaluation may be started from a determination about the direction in which the interference fringes included in the interference contrast image are aligned and a decision about the direction of an S axis.

In the foregoing, the embodiment of the present disclosure has been described, but the present disclosure includes appropriate modifications which do not impair objects and advantages of the present disclosure and is not limited by the above embodiment.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

The invention claimed is:

1. A calculation method of calculating a shear amount produced by a predetermined optical element which is arranged on an optical path of an interference optical system, the calculation method comprising:
   using the interference optical system to capture a plurality of interference contrast images of a quadric surface included in an object surface while changing a phase difference between two rays of light divided by the interference optical system;
   using a processing unit to obtain a phase distribution from the plurality of interference contrast images;
   measuring a fringe interval of interference fringes due to the quadric surface based on the phase distribution; and
   using the processing unit to calculate the shear amount based on a constant in a formula expressing the quadric surface and the fringe interval.

2. The calculation method according to claim 1, wherein the interference optical system is a confocal optical system, and
   the calculation method further comprises:
   using the confocal optical system to measure a three-dimensional shape of the quadric surface; and
   estimating the constant based on the three-dimensional shape.

3. The calculation method according to claim 1, wherein the shear amount is calculated based on a gradient of the phase distribution along a shear direction.

4. The calculation method according to claim 1, wherein the shear amount is calculated based on a cycle of the phase distribution along a shear direction.

5. The calculation method according to claim 1, wherein a change in a slope of the quadric surface in a shear direction is approximated by a linear function.

6. The calculation method according to claim 1, wherein the quadric surface is a surface of a spherical body, and the constant is a radius of the spherical body.

7. An image-capturing method comprising:
   the calculation method according to claim 1;
   adjusting a position of the predetermined optical element based on the shear amount such that a path difference between two rays of light divided by the interference optical system becomes a predetermined value; and
   using the processing unit to capture an interference contrast image of a sample by the interference optical system after the step of adjusting.

8. The image-capturing method according to claim 7, wherein the sample is a transparent substrate or a transparent wafer.

9. An image-capturing apparatus comprising:
   an interference optical system;
   a predetermined optical element arranged on an optical path of the interference optical system; and
   a processing unit configured to generate a phase distribution, by a phase shift method, from a plurality of interference contrast images of a quadric surface included in an object surface, wherein the plurality of interference contrast images are captured while a phase difference between two rays of light divided by the interference optical system is changed, and to subsequently execute a process of calculating a shear amount of the optical element based on a fringe interval of interference fringes due to the quadric surface, the fringe interval being measured from the phase distribution, and a constant in a formula expressing the quadric surface.

10. The image-capturing apparatus according to claim 9, wherein
    the interference optical system is a confocal optical system, and
    the processing unit is further configured to execute a process of estimating the constant based on a three-dimensional shape of the quadric surface, the three-dimensional shape being measured by the confocal optical system.

11. An image-capturing apparatus comprising an interference optical system with a predetermined optical element and a processing unit configured to execute the steps of the calculation method of claim 1 for calculating the shear amount produced by the predetermined optical element.

12. The image-capturing apparatus of claim 11, wherein the interference optical system is a confocal optical system.

13. The image-capturing apparatus of claim 12, wherein the processing unit further executes a process of estimating the constant based on a three-dimensional shape of the quadric surface, the three-dimensional shape being measured by the confocal optical system.

* * * * *